United States Patent [19]
Vienot et al.

[11] Patent Number: 5,835,882
[45] Date of Patent: Nov. 10, 1998

[54] METHOD FOR DETERMINING BARRIERS TO RESERVOIR FLOW

[75] Inventors: Michael E. Vienot; Dennis B. Neff; Edgar L. Butler; Scott A. Runnestrand, all of Bartlesville, Okla.

[73] Assignee: Phillips Petroleum Company, Bartlesville, Okla.

[21] Appl. No.: 791,880

[22] Filed: Jan. 31, 1997

[51] Int. Cl.$^6$ .................................................. G06F 19/00
[52] U.S. Cl. ................................. 702/7; 702/13; 702/16
[58] Field of Search .................................... 364/421, 422; 367/68, 69, 70, 71, 72, 73

[56] References Cited

U.S. PATENT DOCUMENTS

| | | | |
|---|---|---|---|
| 4,964,101 | 10/1990 | Liu et al. | 367/31 |
| 4,991,095 | 2/1991 | Swanson | 364/421 |
| 5,487,001 | 1/1996 | Neff | 364/421 |
| 5,563,949 | 10/1996 | Bahorich et al. | 364/421 |
| 5,583,825 | 12/1996 | Carrazzone et al. | 364/421 |

OTHER PUBLICATIONS

U.S. Patent Application Serial No. 08/457,929, filed Jun. 1, 1995.

*Primary Examiner*—Donald E. McElheny, Jr.
*Attorney, Agent, or Firm*—George E. Bogatie

[57] ABSTRACT

A method and apparatus for predicting barriers to fluid flow in a subterranean reservoir using well data and 3-D seismic data are disclosed, where a preferred first step in the method models petrophysical properties of the reservoir to provide model logs which are expressible as continuous curves of a reservoir property as a function of depth. The next step selects individual data points on the continuous curves, which traverse a subterranean layer, and assigns a flow or nonflow state to each data point based on comparing a threshold value of a reservoir property with the value predicted by the data point. The layer is divided into a multitude of subvolumes each containing a single data point, and then a connectivity factor, which considers multiple flow paths around each data point, is calculated for each subvolume. The subvolumes are then grouped into larger volumes called simulation cells, and directional flow numbers are assigned to the cells relative to three mutually perpendicular x, y and z coordinate axes, such that display of the directional flow numbers for a group of cells demonstrates flow barriers and flow paths in the reservoir.

18 Claims, 11 Drawing Sheets

(2 of 11 Drawing(s) Filed in Color)

METHOD FOR DETERMINING BARRIERS TO RESERVOIR FLOW

This invention relates to production of oil and gas from a subterranean reservoir, and more particularly to modeling fluid flow through a multitude of individual subvolumes of a subterranean layer, for determining barriers to fluid flow in the reservoir.

BACKGROUND OF THE INVENTION

The usual goal of a seismic survey is to produce and display a model of the structure of subsurface layers within an area of interest. To accomplish the survey, an array of seismic sensors is laid out along a line or a grid within the survey area, and an acoustic source is placed at a specific location in the vicinity of the sensor array. The source injects an acoustic signal into the earth which propagates downwardly into the earth and is partially reflected from various earth layers back to the surface, where the reflected signal is detected by the sensor array. The reflected signals detected by each sensor, which are recorded for later processing, are continuous electrical analog signals depicting amplitude versus time. The sensor array is then moved to a new position and the process repeated. When sufficient data has been acquired, the recorded analog signals from the sensors are converted to a digital format by sampling the signals at intervals such as every two milliseconds. Seismic data processing, which can be applied to single traces, is then performed using a digital computer. After processing, the data is reconverted to analog form and displayed as wiggle traces, or as a three-dimensional (3-D) volume of colored bands which more effectively represents a display of subsurface structural features.

While 3-D seismic data has been highly successful for the purpose of imaging seismic reflections, changes in petrophysical properties are difficult to detect on seismic reflection displays due to the limited amount of information that these changes provide in the reflected signal. Accordingly, using seismic data alone, it is difficult to identify important features relating to successful production of oil and gas from a reservoir, such as porosity and permeability in subsurface strata. It is also well known to employ depth-scale well logs, such as wireline well logs to accurately determine petrophysical properties associated with a subterranean formation of interest. Petrophysical properties, which can be obtained from well logging or core sample operations include interval velocity, density, porosity, fluid saturation, lithological composition etc. Such well logs and core data, however, are very limited in areal extent, e.g., to about six to twelve inches around the borehole from which the measurements were taken. Since the petrophysical properties of a subterranean formation can vary widely at different locations in the same strata, such that analysis of data from multiple wells in an area may not correlate helpfully in predicting reservoir production even in the same strata. For example, the same strata may be productive at one location and non-productive at a nearby location. This could be due to a number of different factors, however, a most likely factor is depletion of a hydrocarbon by migration to a different level.

If a well is located within the seismic survey area, depth-scale well logs of direct measurement may be made from which very detailed information becomes available from logs such as lithologic composition, porosity, density, and liquid saturation. From these logs, synthetic time-scale seismic traces may be computed. The synthetic trace is useful for demonstrating to the geophysicists what a seismic time-scale trace should be in the presence of the geologic conditions at or near the well. As used herein, a synthetic seismic trace is an artificial seismic signal developed mathematically from a model of subsurface strata and an assumed source. Accordingly, multiple synthetic traces can be developed by using petrophysical properties measured at the well as an initial model (or a reference point) and making desired perturbations to the measured subterranean properties at the initial model to obtain forward models which are representative of the lithology away from the borehole. This perturbation technique can be expanded to suggest lithologic models farther away from the borehole. Therefore, additional synthetic seismic traces, which are sometimes herein referred to as model traces, may be computed which typify a forward model, i.e., the lithology at some horizontal distance from the borehole.

While synthetic seismic traces may readily be calculated based on actual petrophysical or lithological data, or assumed perturbations to such data, these synthetic traces are subject to certain limitations. For example, a formation made up of a thirty-foot sand having a porosity of 15 percent, could produce the same seismic trace as a fifteen-foot thick sand having a porosity of 30 percent. Accordingly, a nonuniqueness of synthetic traces exists with respect to reservoir structure. In the past seismic/lithologic inversion techniques have either: (1) directly transformed a seismic trace into a pseudo log (usually sonic impedance) via some algorithm such as trace integration, deconvolution or solution of simultaneous equations, or (2) iteratively perturbed forward models on an individual trace basis until synthetic traces generated from them adequately matched the actual seismic data. Since both of these methods fail to address the nonuniqueness limitations of synthetic seismic traces with respect to reservoir acoustic impedance properties, confidence in the reservoir models based on these synthetic traces is lacking.

In the inverse case, from a recorded time-scale real seismic trace or a synthetic seismic trace, and assuming certain initial conditions, one can derive a depth-scale well log showing continuous petrophysical or lithological data for a well location corresponding to the seismic trace. Such a derived well log may be termed a pseudo log, and as used herein, a pseudo log is an artificial log of shaliness, porosity, fluid saturation, sonic, or density derived by inverting a seismic trace based on assumed petrophysical properties, or by perturbing petrophysical properties of an initial well log. While pseudo logs may be readily calculated based on a seismic trace, these pseudo logs are also subject to nonuniqueness in the lithologic/seismic inversion where the pseudo log is transformed into a seismic trace.

In activities such as engineering field development strategies for production from a reservoir, detailed subterranean information about formation thickness, geometry, porosity, volume of shale or sand, hydrocarbon saturation, and permeability of reservoir rock formations is required. This data is desired in areal spacings of thirty to three-hundred feet, however, borehole penetrations, if present, are usually thousands of feet apart in reservoirs. 3-D seismic surveys take subsurface readings at areal spacings of tens of feet and so can help guide the creation of petrophysical maps if real seismic trace records can be converted to accurate subterranean models. Accordingly, a need remains to accurately convert the combination of petrophysical data and seismic data into detailed displays of subterranean petrophysical characteristics.

It is an object of this invention to determine presence or absence of to permeability barriers in subterranean strata.

A more specific object is to combine seismic data and petrophysical data to better predict reservoir flow characteristics.

A still further object of this invention is to provide a computer program which generates a high resolution image of subsurface paths for hydrocarbon movement.

SUMMARY OF THE INVENTION

According to this invention the foregoing and other objects are attained by first modeling general petrophysical properties of a reservoir layer of interest, and then modeling flow characteristics of individual simulation cells within the reservoir layer, such that the flow characteristics of many simulation cells taken together can demonstrate the presence of barriers and/or flow paths within the reservoir layer. The petrophysical model, which is required for the first step of the invention, relies on a basic data set including measured well log petrophysical properties and an appropriately migrated 3-D seismic data volume. While any suitable petrophysical model may be used in this invention, a forward modeling or seismic inversion technique, which recognizes and deals with nonunique inversion (NUI) of seismic/lithologic parameters is preferred. This preferred model, hereinafter referred to as an NUI model, is initiated from the well site and predicts model logs that are expressable as continuous curves of a reservoir property as a function of depth. The model logs are predicted for a multitude of forward model sites which correspond to seismic reflection points. Having information available in the form of continuous NUI model logs at the relatively close spacing of seismic data, a flow versus nonflow condition is determined for NUI data points which are arranged in rows and laterally extending columns throughout the seismic data volume of interest. The NUI data points are selected individual points on the continuous NUI model logs. The flow or no-flow condition of an NUI data point is based on applying a cutoff or threshold level, which is a value or a composite value of two or more petrophysical properties, for flow to take place through the NUI data point. The 3-D seismic data volume is next divided into a multitude of subvolumes, where each subvolume contains one of the NUI data points. Five flow paths through and around each subvolume are defined with respect to mutually perpendicular x, y and z coordinate axes, and the paths are analyzed with reference to the coordinate axes. This analysis defines numerical connectivity factors (CF) for each subvolume, or equivalent NUI data point, for flow directed along each of the coordinate axes. Next, clusters of the subvolumes are defined to form simulation cells. Flow characteristics of the simulation cells are then analyzed with respect to the coordinate axes. In the simulation cell analysis, a desired number of slices normal to each of the coordinate axes are defined for each simulation cell, where each of these slices encloses a set of the subvolumes within the cell. A planar connectivity factor is computed for each slice as the arithmetic average of the numerical connectivity factors of the set of subvolumes in the normal direction of the slice. Finally, the planar connectivity factors for each slice are harmonically averaged along each of the coordinate axes for each simulation cell, and the numerical flow numbers for a group of adjoining simulation cells can be used to demonstrate fluid barriers and/or flow paths in each direction within the reservoir layer.

In accordance with another aspect of this invention, apparatus comprises a computer programmed to carry out the above described method. In yet another aspect, a program storage device comprises a computer readable medium having computer program code embodied therein for causing the computer to carry out the above described method.

BRIEF DESCRIPTION OF THE DRAWINGS

The file of the patent contains at least one drawing executed in color. Copies of this patent with the color drawing will be provided by the Patent and Trademark Office upon request and payment of the necessary fee.

DETAILED DESCRIPTION OF THE INVENTION

Figure 3A:
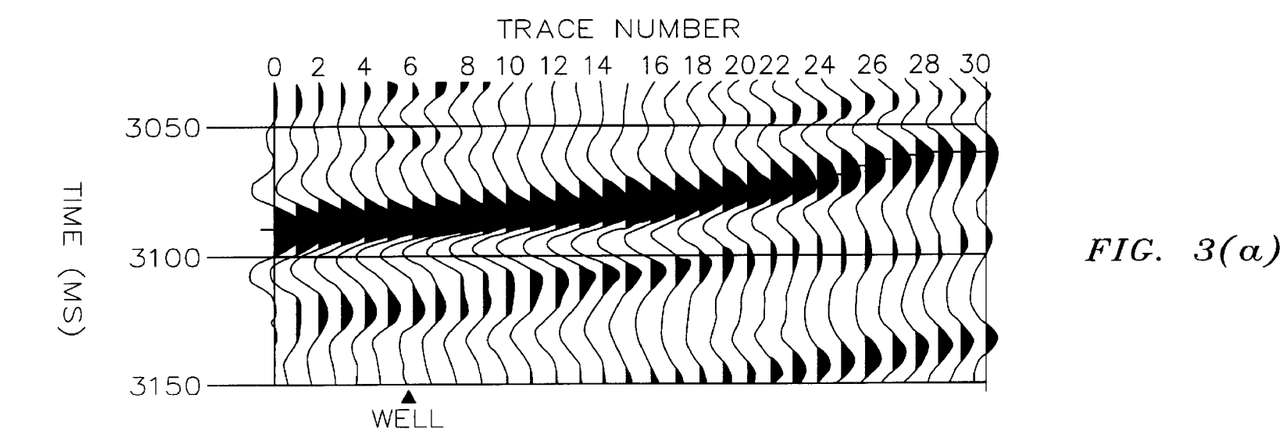
FIG. 3(a) is a typical seismic section.
Figure 3B:
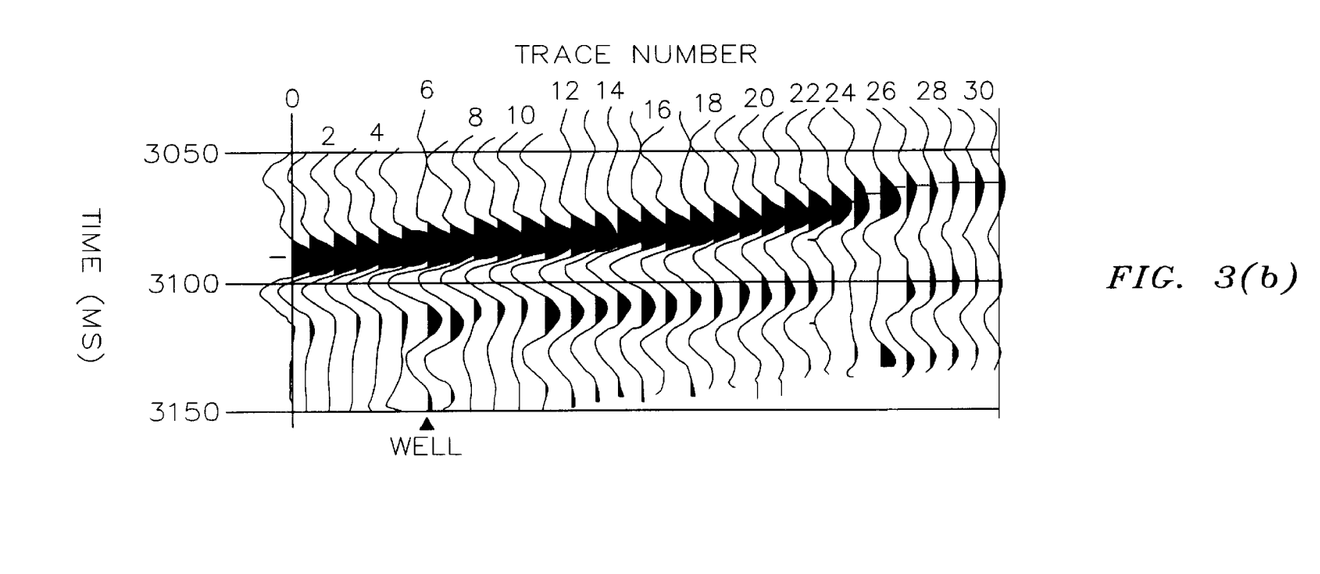
FIG. 3(b) represents synthetic traces corresponding the seismic section of FIG. 1.

The abundances of three-dimensional seismic data that is available, and the increased attention by geophysicists to reservoir characterization studies, have provided combinations of the basic data from which improved seismic inversion schemes can be applied. The basic data to which this invention is applied is in the form of a spacial sequence of seismic time scale traces, which have been recorded, stacked and properly migrated over a restricted time window as known in the art, and additionally includes lithological and petrophysical information from one or more wells located within the seismic survey area. Synthetic seismograms and pseudo logs can be computed from the basic data and then extended to pose numerous lithologic conditions which are likely to be found at forward model sites. Details of wavelet processing for producing synthetic seismograms, is disclosed with reference to FIG. 3 in U.S. Pat. No. 5,487,001 of Dennis Neff, filed May 28, 1993, the entire disclosure of which is incorporated herein by reference. Also explained with reference to the example in the incorporated disclosure are details of producing pseudo logs including lithologic ($V_{sh}$), saturation ($S_w$), porosity ($\phi$), pay zone, sonic ($\Delta t$) and density ($\rho$).

In the preferred embodiment of this invention, a first step in determining an NUI model for petrophysical properties, is obtaining a 3-D seismic survey surrounding a well, along with lithological and petrophysical information from at least one well, for example, from well logs and coring operations. The method defines an initial lithological model at a reference well location which includes velocity and density logs derived by using petrophysical equations to integrate measured porosity, composition, and saturation logs into the velocity and density logs. The real seismic trace corresponding to the well location is associated with the initial model such that lithologic data is paired with the seismic data at the well site. Forward model perturbation techniques are then used to pair seismic and lithological data at the model sites.

The known petrophysical parameters of the respective formations at well locations are systematically perturbed and in this manner a large number of synthetic seismograms, or so called synthetic seismic traces, is determined in order to build a catalog of synthetic traces of sufficient size that a range of lithologic and petrophysical parameters is included for each forward model site that bracket known conditions of the initial model.

Figure 1:
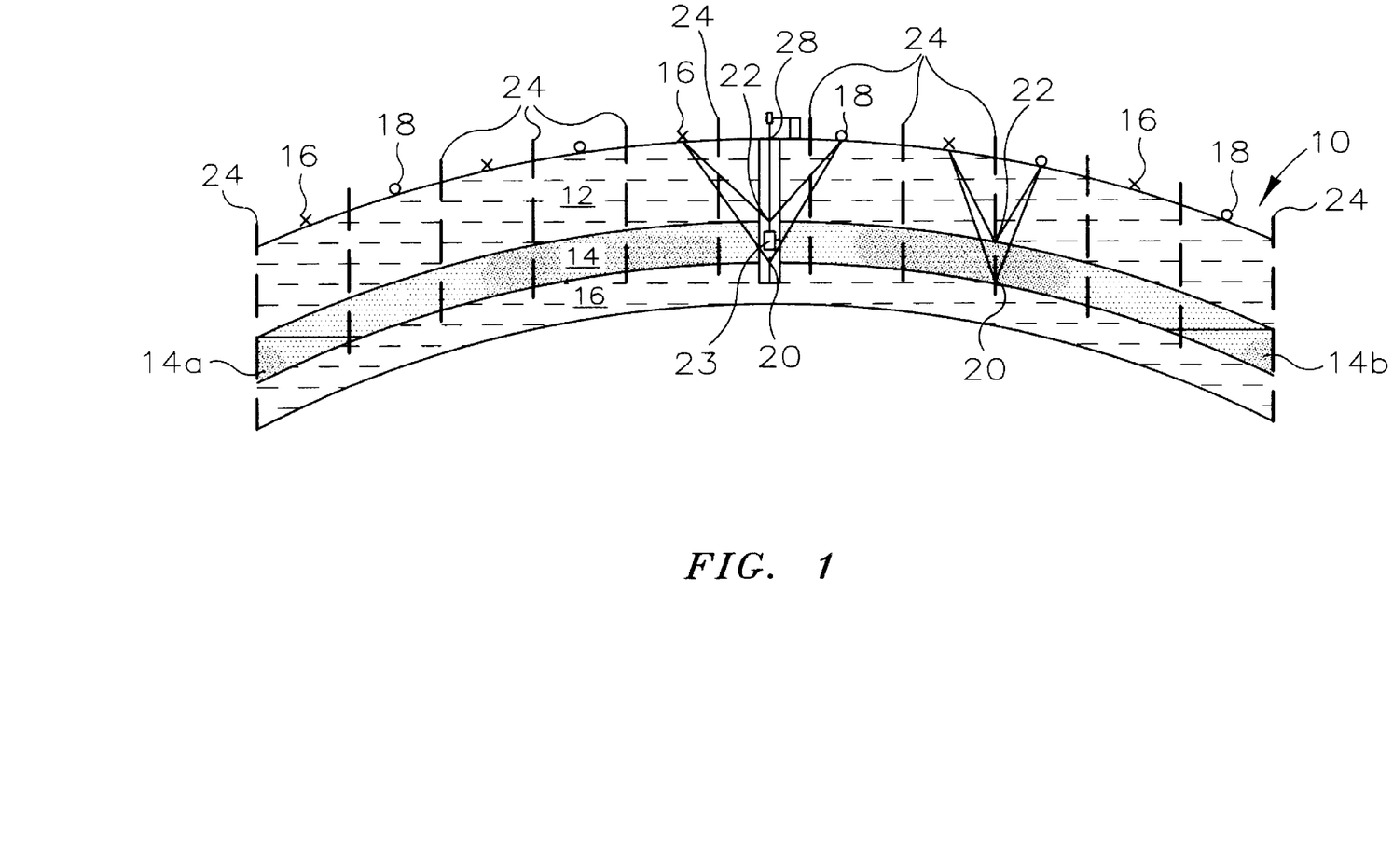
FIG. 1 is a generalized cross section of the earth showing seismic reflection points at a well and at forward model sites.

The various steps of the method of the invention will now be described in more detail with reference to a generalized hydrocarbon reservoir. Referring specifically now to FIG. 1, the earth surface 10 and the underlying cross section of the earth having multiple lithological layers, is illustrated. Examples of subsurface layers are illustrated at 12, 14, and 16. Layer 14 is illustrated as producing hydrocarbon from a well 28 at the center of the layer and, as illustrated, the layer 14 has water sections at 14(a) and 14(b). A 3-D seismic survey is carried out by positioning a grid of seismic sources, illustrated at 16, and seismic receivers such as shown at 18, which generate seismic traces reflected from the hydrocarbon layer 14 at points such as illustrated at 20 and 22. While only one set of reflection points away from the well is illustrated, it is to be understood that seismic traces reflected from each of the locations designated as 24 would include traces from an array of sources and receivers having a common mid points at each location 24. The locations 24 shown in FIG. 1 coincide with forward model sites. As used herein, a forward model site is the location of a vertical line traversing a subterranean layer, and which connects seismic reflection points from upper and lower boundaries of the layer. Also illustrated in FIG. 1, is a well logging tool 23 used to make various well logging measurements through the layer 14.

Figure 4:
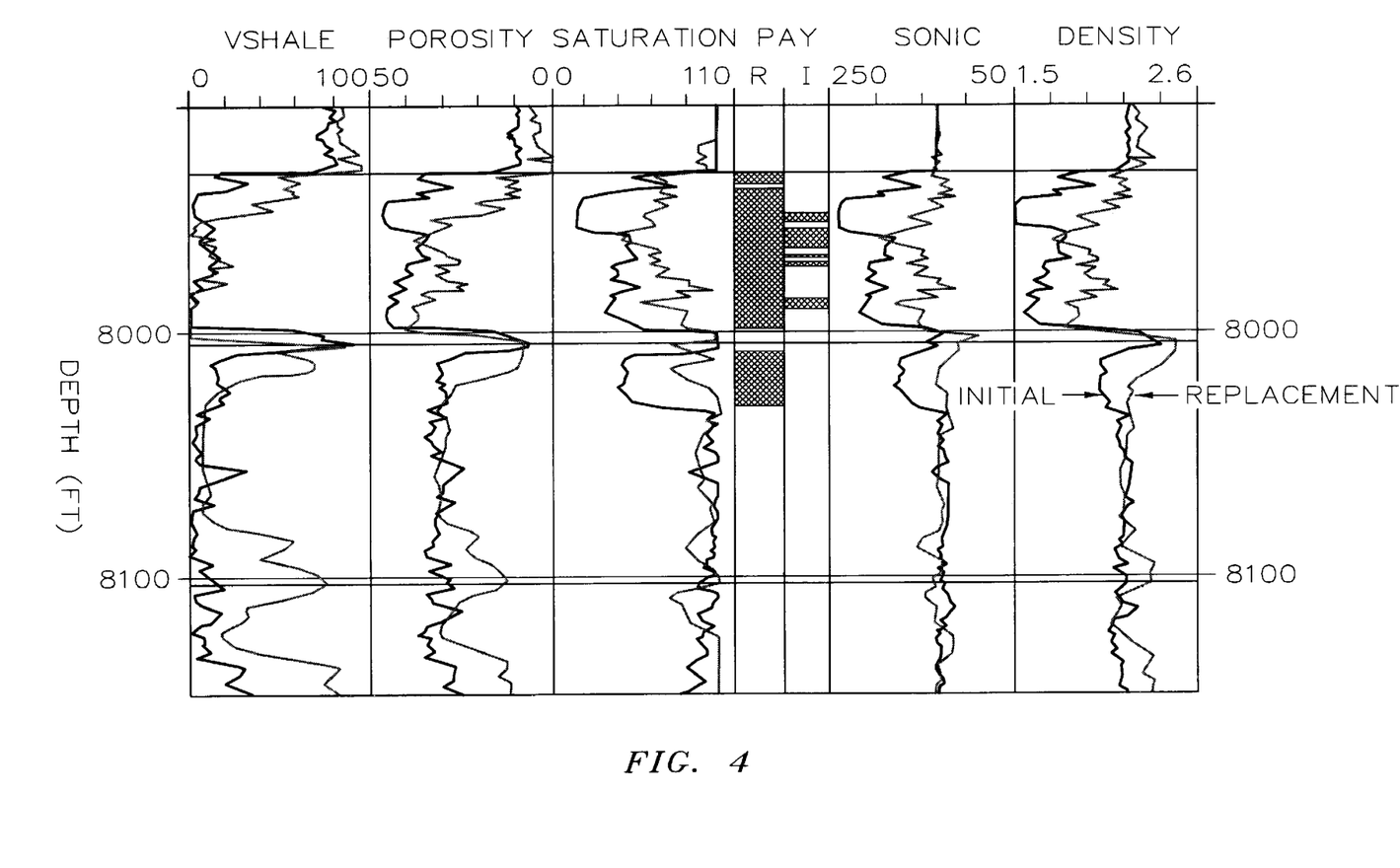
FIG. 4 illustrates a lithological well log suite pertinent to this invention.

The first step is to obtain initial data which includes: (1) a 3-D seismic survey in the form of seismic signals reflected from subterranean points as illustrated in FIG. 3, and (2) well log data as illustrated in FIG. 4. Methods by which such seismic data and well log data is obtained and processed to useful forms is well known to those skilled in the art.

As previously mentioned, the initial data includes a lithological model at a reference well location 28 which is based on measured well data. The initial model includes a velocity and a density log derived by using petrophysical equations to integrate measured porosity, composition and fluid saturation into the velocity and density logs, and a real seismic trace which is paired with the initial well logs. Method by which such association can be accomplished is described in the previously incorporated reference.

Figure 2A:
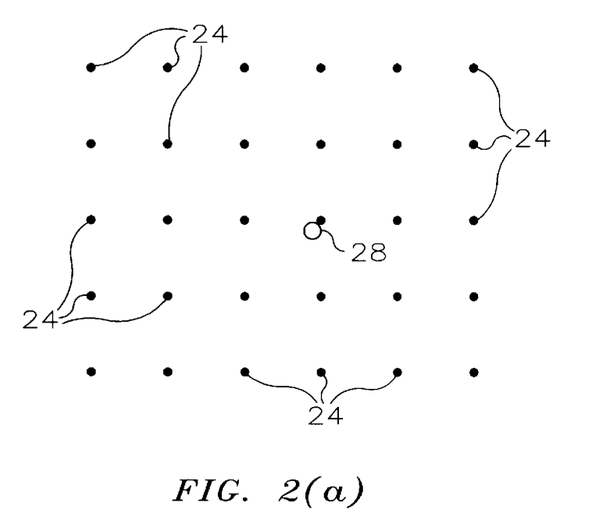
FIG. 2(a) is a plan view of FIG. 1 showing a well and surrounding model sites.
Figure 2B:
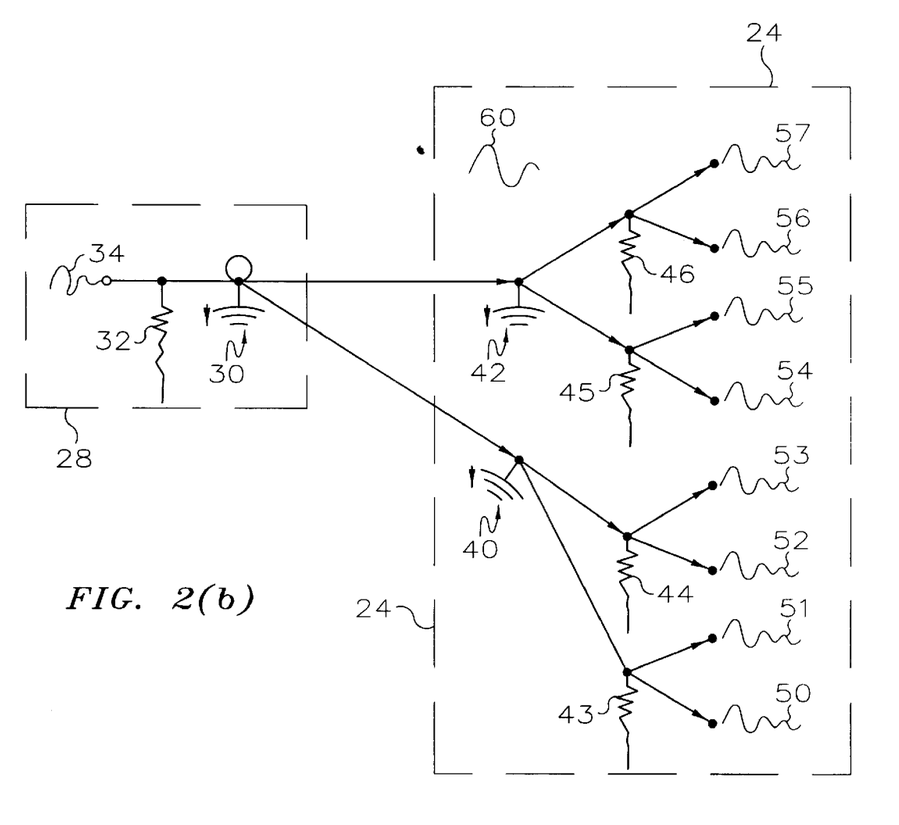
FIG. 2(b) is a schematic diagram illustrating petrophysical model development for one forward model site.

FIG. 2(a) is a plan view of a portion of the 3-D volume illustrated in FIG. 1, showing well 28 surrounded by seismic reflection points 24, which coincide with forward model sites. The forward modeling technique constructs a catalog of synthetic forward model traces. The technique is more clearly illustrated with reference to FIG. 2(b), which shows a well illustrated by the dash line 28 and a single forward model site illustrated by the dash line 24. The initial model at the well site 28 includes measured lithological conditions 30, a measured velocity and/or density log 32, which incorporates petrophysical parameters, and a real seismic trace 34. To obtain the forward model, the known conditions 30 at the initial site are perturbed to pose likely lithological conditions at the forward site 24. As illustrated, two conditions 40 and 42 are proposed, although it is recognized that any desired number of conditions could be proposed. For each proposed lithological condition a number of geologically feasible pseudo logs can be constructed for the model site 24. In FIG. 2(b), two pseudo logs are constructed for each proposed condition as illustrated at 43–46. Again, it is recognized that additional pseudo logs could be constructed if desired. Then for each pseudo log a number of synthetic seismic model traces are derived. In FIG. 2(b), two synthetic model traces are derived for each pseudo log as illustrated at 50–57, although more than two synthetic traces for each pseudo log could be included. Accordingly at each forward site, model elements include four attributes: a real seismic trace 60, at least two lithological conditions 40 and 42, at least four pseudo logs 43–46, and at least eight synthetic model seismic traces 50–57.

FIG. 4 shows a typical computer work station display for the suit of logs of interest in this invention including petrophysical parameters of shaliness ($V_{SH}$), saturation ($S_w$) and porosity ($\phi$), pay zone, sonic ($\Delta t$) and density ($\rho$), which are applicable to the present invention. Appropriate scales for the illustrated logs are marked on the horizontal axis, and the well depth in feet is indicated on the vertical axis. Also shown in FIG. 4 is the definition of a layer boundary for reflecting horizons indicating the cross section of volume which could be selected for detailed modeling according to this invention.

Parameters of interest for modeling include those which might indicate a subterranean layer containing hydrocarbons in sufficient quantity to justify commercial production such as layer thickness, shaliness, porosity, permeability, water saturation, etc. This is accomplished by association of a real seismic trace at a model location, such as trace 60 in FIG. 2(b), with the most likely of the several various petrophysical parameter proposed for the model site. Forward modeling is thus employed where perturbations in petrophysical properties are representative of probable and reasonable variations of the petrophysical property or properties of the initial model, without regard to analysis of the real seismic traces at the forward model site.

Referring now to FIG. 3(a), there is illustrated a seismic section of recorded and processed seismic traces such as might be obtained from a cross section of earth illustrated in FIG. 1. FIG. 3(b) shows one set (of many possible sets), of corresponding model traces, which are synthetic model traces such as illustrated at 50–57 in FIG. 2(b), each of which synthetic traces is paired with a pseudo log and a petrophysical condition, also as illustrated in FIG. 2(b). Seismic station numbers 0–30 are indicated at the top of the section on the horizontal axis of FIG. 3, and intervals of two-way seismic travel time in milliseconds are marked on the vertical axis.

Figure 5:
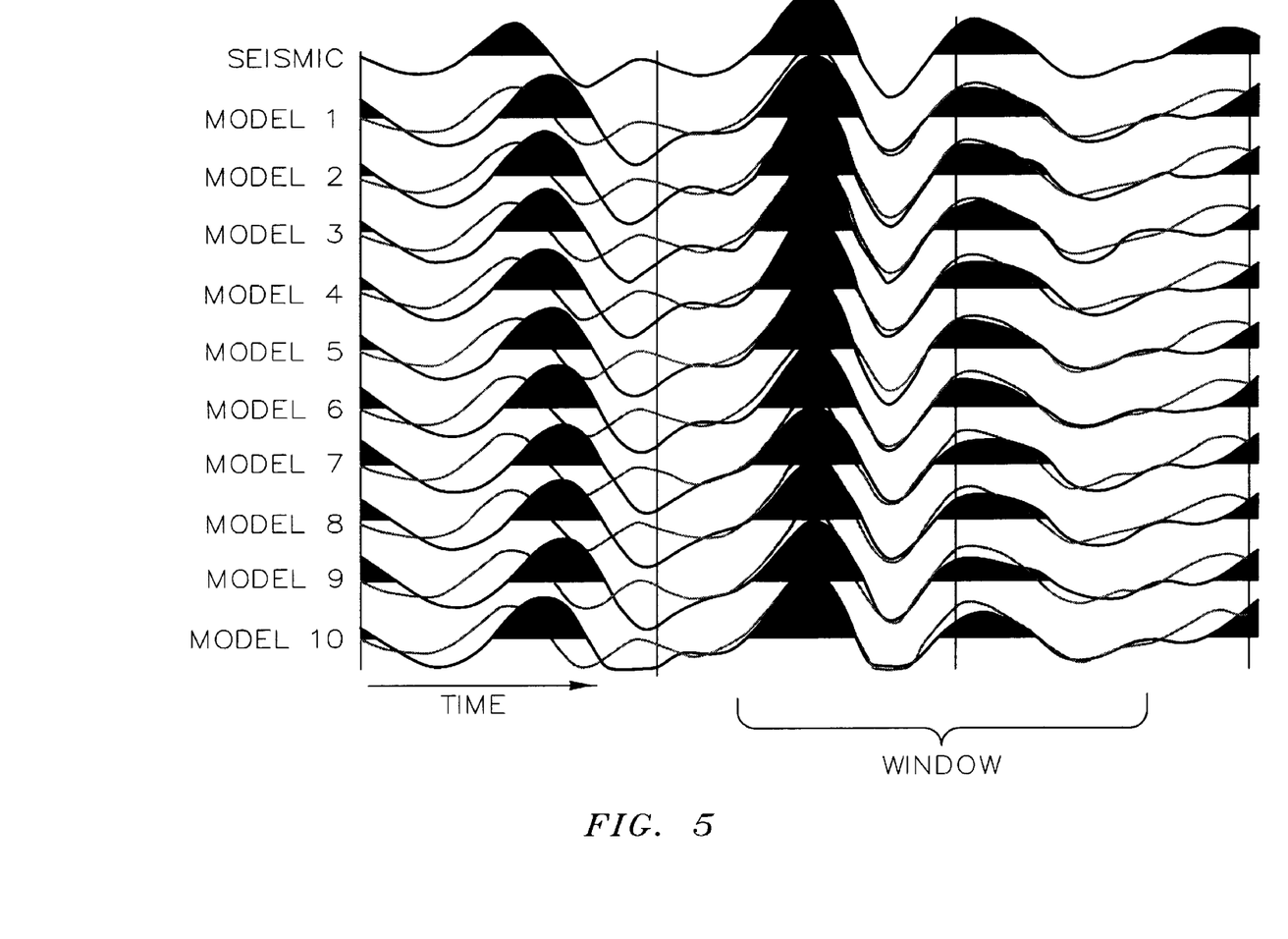
FIG. 5 illustrates comparison of a real seismic trace with 10 synthetic model traces.

The process of matching the catalog of synthetic seismic traces to real traces is illustrated with reference to FIG. 5. This figure shows a comparison of a real seismic trace with ten synthetic traces. A typical catalog of synthetic traces would include from about 1,000 to about 200,000 traces. As previously mentioned, however, a computer is used for comparing every synthetic forward model trace in the catalog with each real trace in the seismic survey, and several (e.g. 10 to 50) different synthetic traces are selected for each forward model site which "best fit" the real seismic trace for the model site in some manner. The measure of similarity between synthetic and real traces includes a mathematical calculation of four factors. These factors include an absolute average difference factor, a so called RB factor, a cross correlation coefficient and a cross correlation lag, where any of these factors may be weighted depending, for example, on confidence in the basic data. The cross correlation technique is usually limited to a small time window of about thirty milliseconds (ms) to about one-hundred ms of the seismic trace, as illustrated in FIG. 5. This time window is adjusted to include the reservoir zone of interest plus any overburden or underburden zones that could influence seismic reflections. The selection method shown utilized two reference horizons, however, a single horizon which serves as the zero lag position for cross correlation operations and as a reference time for the positioning of pseudo logs may be employed. The seismic section data volume is relative amplitude and preferably zero phase.

Table I shows the numerical comparison of the ten selected "best fit" traces illustrated in FIG. 5, where all of the cross correlation coefficients are greater than 0.984; correlation lags are 3 or less; average absolute difference is 0.0104 or less and the RB factor is greater than 0.983. A cross correlation value of 1.0, with an average difference value of zero represents a perfect match. The most robust comparison of the model and real seismic traces occurs, however, when the cross correlation and absolute value differences are independently normalized to a scale of −1.0 to 1.0 and then ranked upon a combined value called the RB factor, which is shown in Table I. An RB factor of 1.0 represents a perfect match, and values less than 1.0 reflect progressively less similar waveforms.

TABLE I

Seismic Trace Comparison

| Model CDP | K-Corr Coefficient | X-Corr Lag | Avg abs Diff | RB-Factor |
|---|---|---|---|---|
| 1 | 0.9858 | 2 | 0.0100 | 0.9841 |
| 2 | 0.9903 | 2 | 0.0091 | 0.9885 |
| 3 | 0.9864 | 2 | 0.0104 | 0.9834 |
| 4 | 0.9855 | 2 | 0.0104 | 0.9830 |
| 5 | 0.9843 | 3 | 0.0090 | 0.9858 |
| 6 | 0.9867 | 3 | 0.0089 | 0.9871 |
| 7 | 0.9841 | 2 | 0.0093 | 0.9850 |
| 8 | 0.9851 | 2 | 0.0088 | 0.9865 |
| 9 | 0.9852 | 2 | 0.0098 | 0.9842 |
| 10 | 0.9862 | 1 | 0.0080 | 0.9890 |

Figure 6:
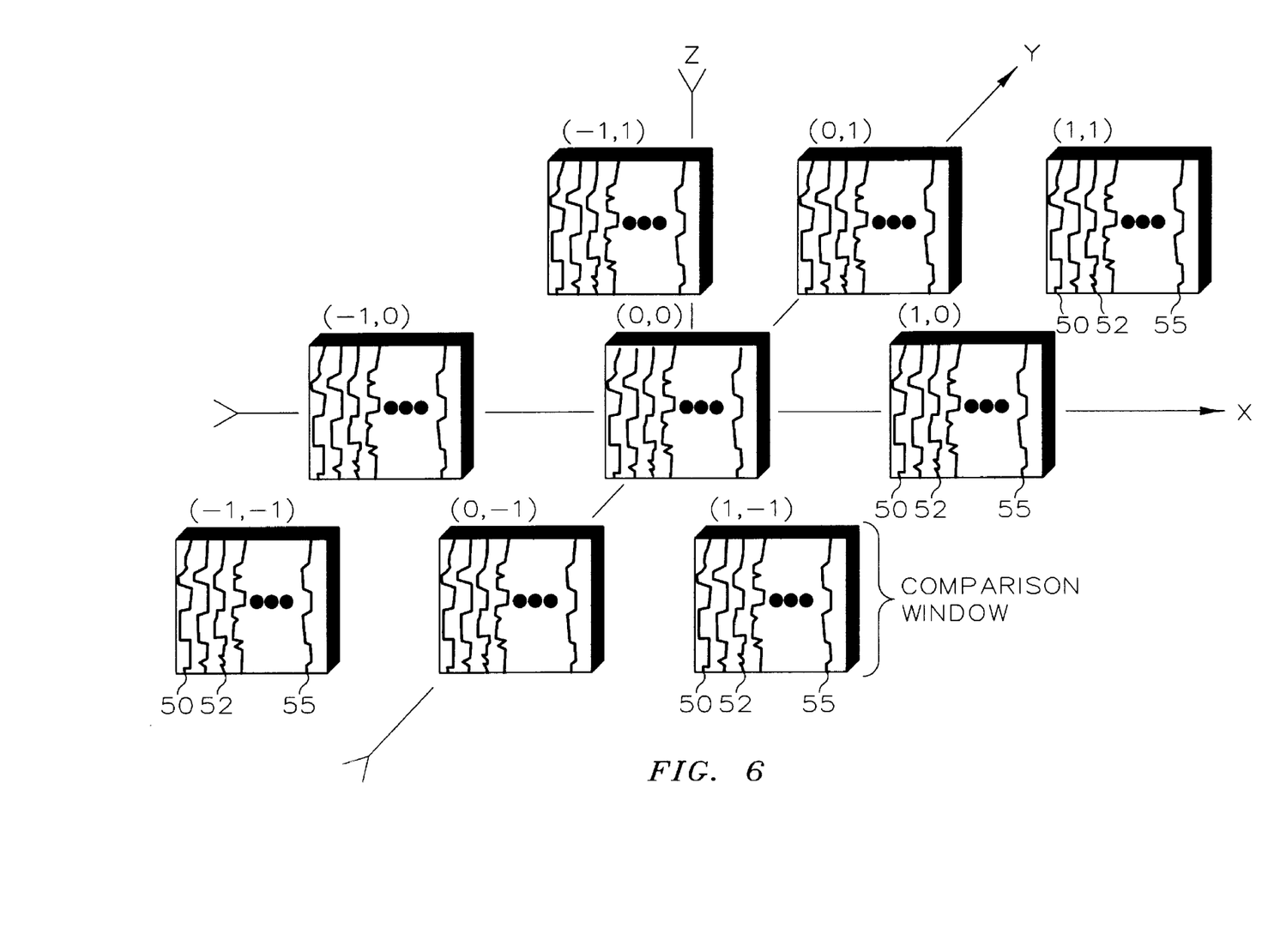
FIG. 6 is a pictorial drawing illustrating the coherence analysis scheme.

Many synthetic trace solutions can satisfy the real seismic data, for example the ten model traces illustrated in FIG. 5 each satisfactorily match the real seismic trace. Since most of these matching synthetic traces cannot be ruled out as being paired with geologically unacceptable lithology at a model site, a coherent numerical analysis scheme is used to compare the pseudo logs, which are paired with the selected "best fit" synthetic traces with corresponding pseudo logs for adjoining sites. Referring now to FIG. 6, nine forward model sites are illustrated, within a volume to be modeled, where the sites are identified according to x and y coordinates shown by the numbers in parenthesis. A third axis labeled z is also shown which is indicative of time or alternately depth. For each model site, several pseudo log traces are illustrated, for example at reference numerals 50–55, which are the pseudo logs paired with the selected "best fit" synthetic seismic traces for each model site. A numerical analysis scheme, as previously illustrated with reference to FIG. 5, compares pseudo logs for each site with pseudo logs for adjoining sites. For example pseudo logs associated with site location 0,0 are compared to corresponding pseudo logs for the eight surrounding sites. The numerical analysis then selects the single pseudo log for each model site that is most harmonious with it's geological surroundings as the continuous NUI model log for that site. The numerical coherency scheme may take various forms. Whatever it's form, it's function is to compare similarity of petrophysical properties at adjacent sites. The scheme may include criteria such as: (a) which pseudo log i.e., porosity, permeability, impedance, etc., to compare, (b) the number of selected pseudo logs at each site, (c) the depth or time interval used for comparison; (d) quality of the seismic match; and (e) radial distance from the central location. Relative weighting factors may also be used in conjunction with the above criteria. For example, diagonal corner pseudo logs traces, such as 1,1 and −1,−1, are preferably weighted at 70 percent for selecting the central log. In general the same time window is used for coherent testing of pseudo logs and cross correlation of seismic traces.

The coherence matching scheme allows maps in three dimensional image model displays of subterranean volumes to have more geologically reasonable trends, while still maintaining high resolution of the seismic survey.

Having detailed information available in the form of continuous NUI model logs at the relatively close spacing of the seismic data, a flow versus nonflow state is determined for NUI data points, which are arranged in rows and columns throughout the seismic data volume of interest. These NUI data points are selected points on the NUI model log and provide predicted values of petrophysical properties such as permeability, porosity, shaliness, etc., at various depths over the survey volume. The NUI petrophysical values can be compared with known engineering/petrophysical relationships to indicate a flow or nonflow state for each NUI data point. The preferred method for determining a flow versus nonflow state of an NUI data point is establishing a threshold or cutoff value for a property such as permeability, porosity, saturation or shaliness which is the minimum or maximum value of the property for flow to occur, as would be well known to one skilled in the art. The NUI value is then compared with the threshold or cutoff value. Also contemplated are threshold and cutoff values that are composites of two or more petrophysical properties.

Figure 7A:
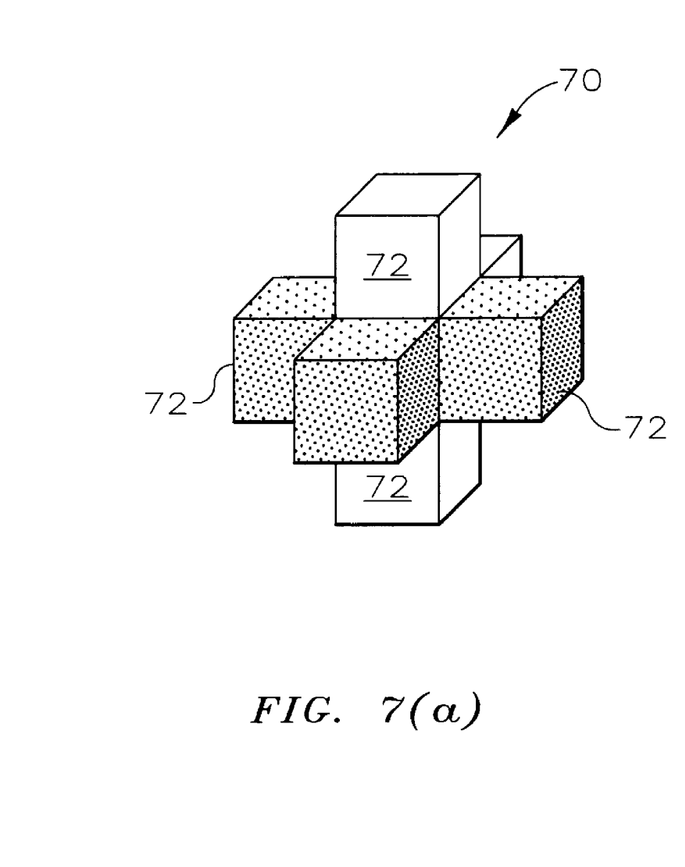
FIG. 7(a) is a perspective view depicting reservoir subvolumes.
Figure 7B:
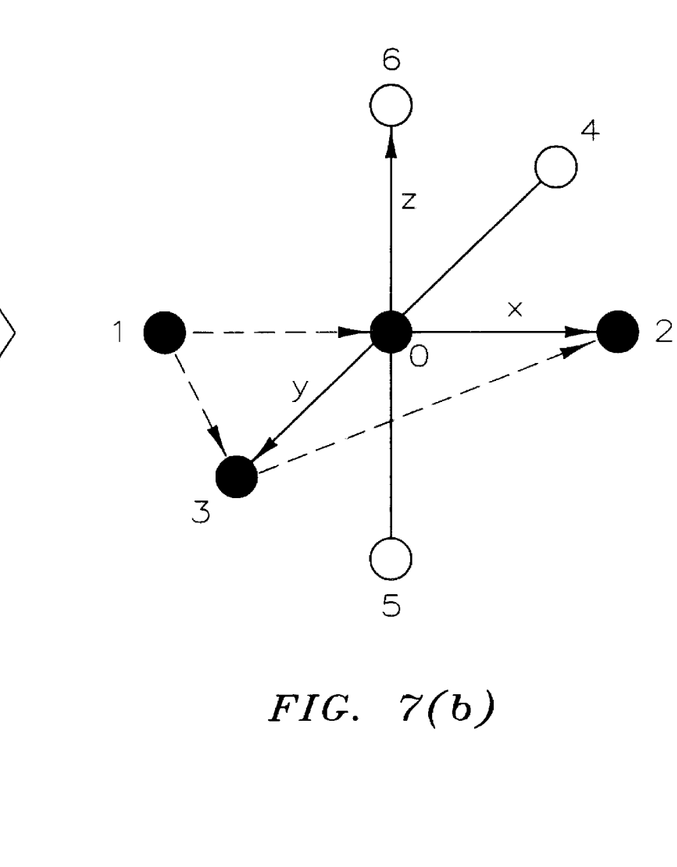
FIG. 7(b) is a simplified schematic illustrating subterranean flow through subvolume paths according to the invention.

Next the 3-D seismic volume of interest is divided into a relatively large number of adjoining subvolumes, where each subvolume encloses a single NUI data point. Accordingly, the dimensions of the subvolume depend upon the spacing of the seismic data. Referring now to FIG. 7(a), a group of seven subvolumes, generally indicated at reference character 70, are illustrated as a cluster of cubes 72, although the subvolume is not required to be a cube. The requirement is that the subvolume enclose one NUI data point, and the illustrated cube is one of many shapes contemplated for the subvolumes. Still referring to FIG. 7(a), the shaded cubes indicate subvolumes containing NUI data points that satisfied the aforementioned flow versus nonflow criteria, and the unshaded cubes sindicate nonflow data points. Referring now to FIG. 7(b), NUI data points, which are illustrated for convenience as reference numerals 0 through 6, depict the same flow/nonflow data illustrated in FIG. 7(a), but with reference to mutually perpendicular x, y and z coordinate axes. Thus FIG. 7(b) readily shows examples of relative distances between the NUI data points 0–6.

For each NUI data point a connectivity factor (CF) is calculated for each of the three mutually perpendicular axes. For each direction there is a primary flow path and four alternate flow paths, one of the alternate flow paths is shown in FIG. 7(b), where the primary path in the x direction from 1 to 2 is (1-0-2). Alternate paths are (1-5-2), (1-3-2), (1-4-2) and (1-6-2). If all of the NUI data points along a path indicate a flow state, then the path is considered to be valid for flow to exist. The fluid connectivity for each path is assumed to be inversely proportional to the length of the path.

EXAMPLE

This example illustrates calculation of a connectivity factor (CF) for flow paths through and around the NUI data point shown as 0 in FIG. 7(b). As previously mentioned the shaded points 0, 1, 2 and 3 represent flow points and the unshaded points 4, 5 and 6 represent nonflow points. The connectivity factors are calculated according to the formula:

$$CF = \frac{1}{a} + \frac{1}{b} + \frac{1}{c} + \ldots \frac{1}{n}$$

where:

a, b and c are the distances between points in the flow path. If the distances shown in FIG. 7(b) are:

$1 \rightarrow 0 = 0 \rightarrow 2 = 120$ ft;

$1 \rightarrow 3 = 1 \rightarrow 4 = 200$ ft;

$1 \rightarrow 5 = 1 \rightarrow 6 = 130$ ft; and $0 \rightarrow 6 = 0 \rightarrow 5 = 50$ ft.

Then the open flow paths shown in FIG. 7(b) for the x direction are given by the equation:

$$CF_{(x)} = CF(1-0-2) + CF(1-3-2)$$

Evaluating the above gives:

$$CF_{(x)} = \frac{1}{(2 \times 120)} + \frac{1}{(2 \times 200)} = 0.00667$$

Next $CF_{(x)}$ is normalized by the maximum connectivity in the x direction, which is given by the equation:

$$\begin{aligned}CF_{(MAX)} &= CF(1-0-2) + CF(1-3-2) + CF(1-4-2) + \\ &\quad CF(1-5-2) + CF(1-6-2) \\ &= \frac{1}{(2 \times 120)} + \frac{1}{(2 \times 130)} + \frac{1}{(2 \times 130)} + \\ &\quad \frac{1}{(2 \times 200)} + \frac{1}{(2 \times 200)} = 0.1687\end{aligned}$$

$$NCF_{(x)} = \frac{0.00667}{0.01687} = 0.3954$$

Which is the value of the normalized CF in the x direction.

Figure 8A:
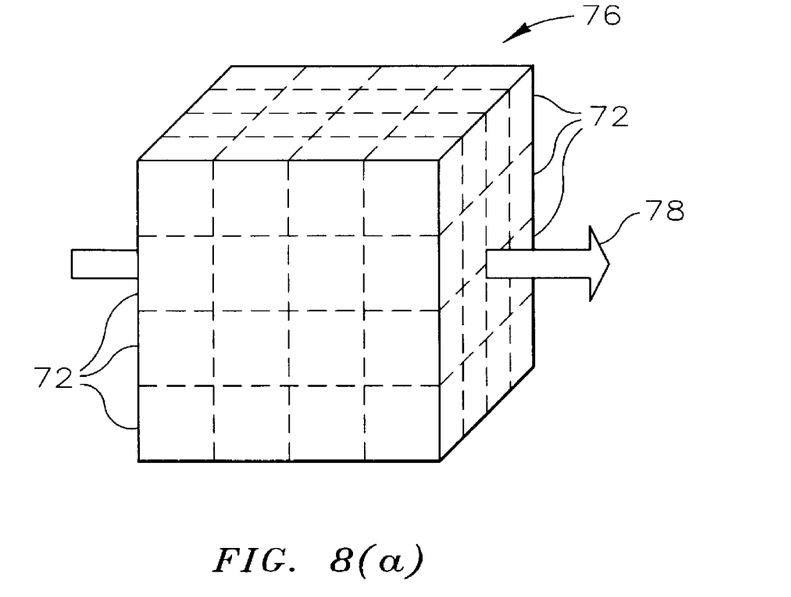
FIG. 8(a) is a perspective view depicting a reservoir simulation cell.
Figure 8B:
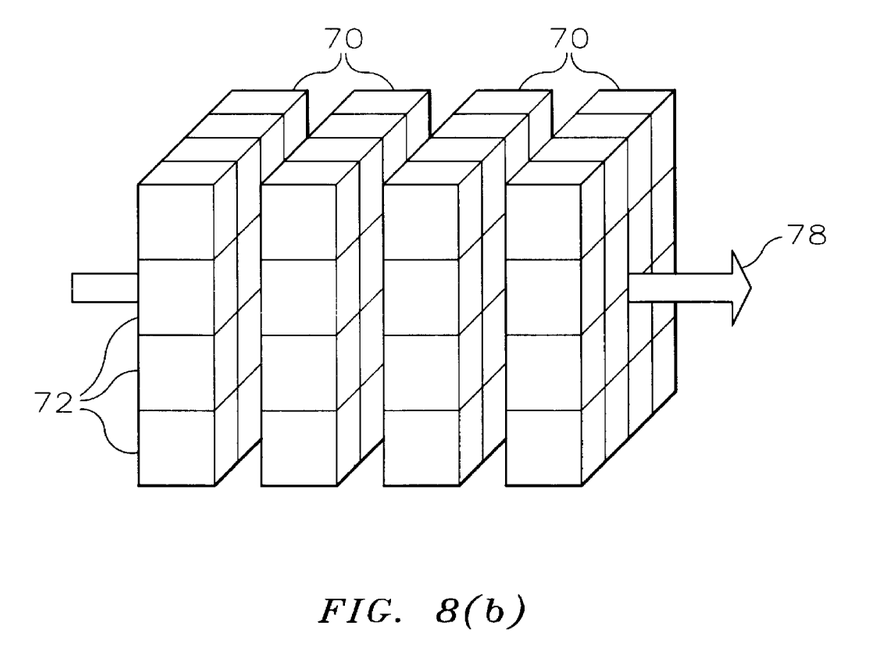
FIG. 8(b) is a perspective view depicting slices of the simulation cells of FIG. 8(a).

In the next step illustrated in FIG. 8(a), a number of adjoining individual subvolumes 72 are arranged in a group to form a reservoir simulation cell, generally shown at 76. Flow directed along the x axis is shown by the arrow 78. A preferred method for defining the size of the simulation cell 76, along with adjoining cells, is to overlay a lattice pattern on a particular layer of interest in the petrophysical model. The simulation cells and NUI data points can then be defined for each opening in the lattice pattern. For analyzing flow paths through the cell, the preferred method is to divide the cell 76 into a desired number of slices perpendicular to each of the three mutually perpendicular x, y and z axes. FIG. 8(b) shows the simulation cell divided into four slices along the x-axis as, illustrated at reference number 70, and it is obvious that similar divisions could be made for the y and z axes. Still referring to FIG. 8(b), each of the illustrated slices 70 includes sixteen subvolumes 72. A planar connectivity factor is then calculated for each slice 70 by arithmetically averaging the $CF_{(x)}$ values of the sixteen subvolumes in each slice. A numerical x-axis flow number (FN) for the cell is then computed by harmonically averaging the planar connectivity factors of the four slices along the x-axis. For this calculation the harmonic average for n numbers is used herein according to its ordinary meaning defined as: the reciprocal of the arithmetical mean of their reciprocals for n numbers. For example, the harmonic mean of a, b, c, . . . n is:

$$\left[ \frac{a^{-1} + b^{-1} + c^{-1} + \ldots n^{-1}}{n} \right]^{-1}$$

The thus derived flow numbers can be used to generate displays that illustrate subterranean barriers and flow paths in a specified direction.

As those skilled in the art can appreciate, the method of the invention requires a very large amount of detailed calculations, such as generating a catalog of synthetic traces, pseudo logs, comparing real and synthetic seismic traces, as well as comparing pseudo logs of neighboring model sites. Further processing includes comparisons of NUI data points with predefined values, calculation of flow factors, and finally generating color displays employing various shades and hues.

Figure 9:
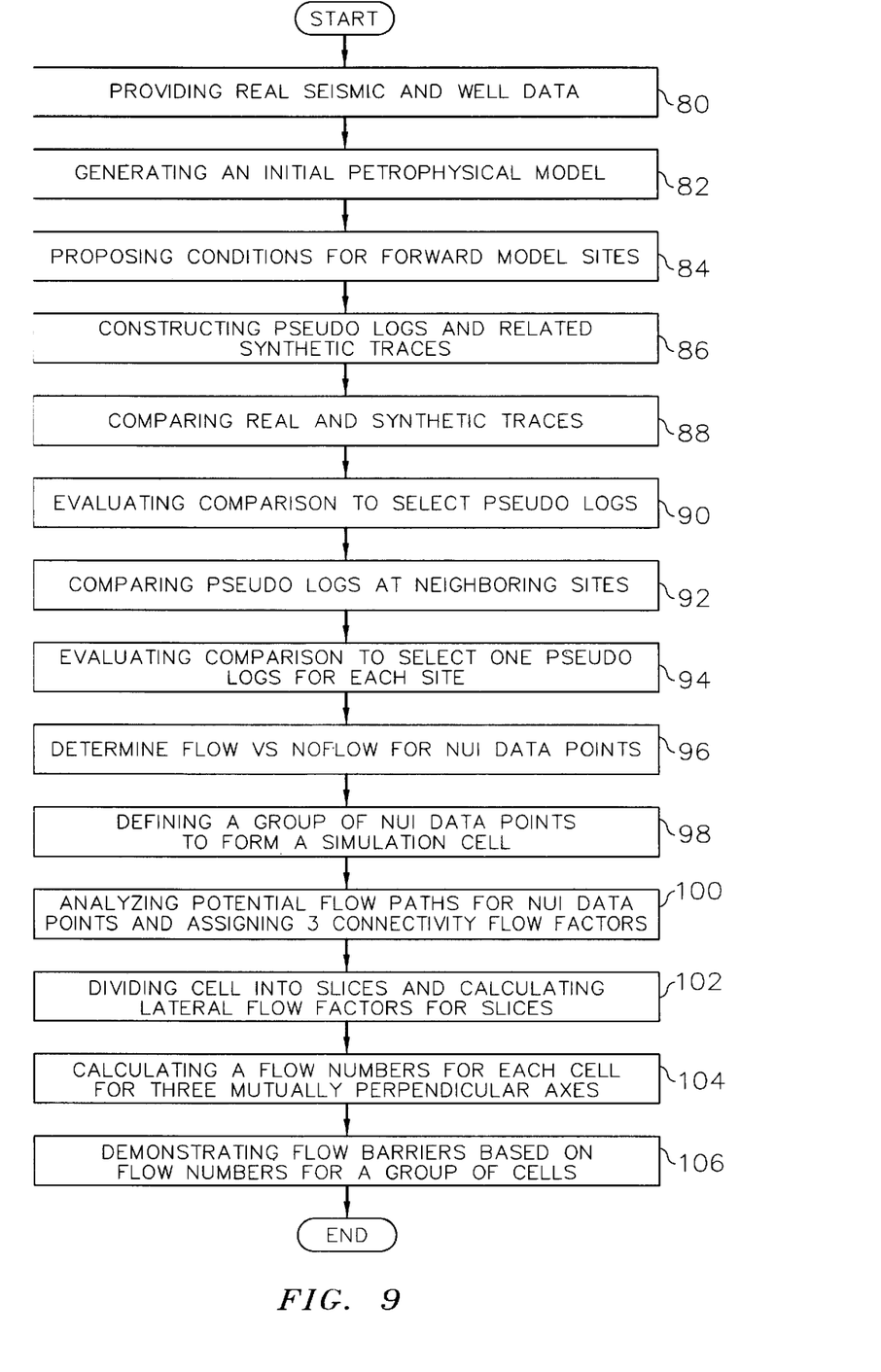
FIG. 9 is a simplified flow chart for computer implementation according to this invention.

Accordingly, FIG. 9 is a flow diagram for computer implementation of the process of this invention. In FIG. 9, initially as shown at 80, all seismic data and lithological data are assembled to provide the required basic data which includes a 3-D seismic data volume and measured well data. At step 82 an initial model is generated that includes petrophysical parameters pertinent to the desired result. Initial lithological data is then perturbed to propose plural petrophysical properties at forward model sites, as expressed in block 84. For each proposed petrophysical property plural pseudo logs are calculated and associated with the model site, and a plurality of synthetic seismic traces are calculated for each of the proposed pseudo logs at step 86. The next step 88 involves comparing real seismic traces with the calculated synthetic traces to identify at least several synthetic traces that best match a real seismic trace in some manner. Next at step 90, plural pseudo logs, which are associated with the identified synthetic traces, are coupled with each model site. Plural pseudo logs at each model site are compared to neighboring sites at step 92, and based on this comparison a single pseudo log is selected as a model log for each forward site at step 94.

In step 96 flow calculations begin where NUI data points are compared to predetermined threshold or cutoff values to determine a flow versus nonflow state for the NUI point. Next at step 98 a group of NUI data points are selected to from a simulation cell. At step 100 numerical connectivity factors are calculated that typify the potential for flow in three mutually perpendicular directions for each NUI data point. The simulation cell is divided into a number of slices along each of the three coordinate axis in step 102, and a planar connectivity factor is calculated for each slice. Next in step 104 three flow numbers (FN) for each cell are calculated, i.e., one FN for each axis and these flow numbers can be plotted in either plan or cross sectional views to demonstrate barriers and flow paths in reservoir flow as expressed in step 106. Colored plots using a large number of shades and hues to show a wide range of values, such as illustrated in FIGS. 10 and 11 are preferred for the demonstration of flow barriers or flow paths in the reservoir.

Figure 10:
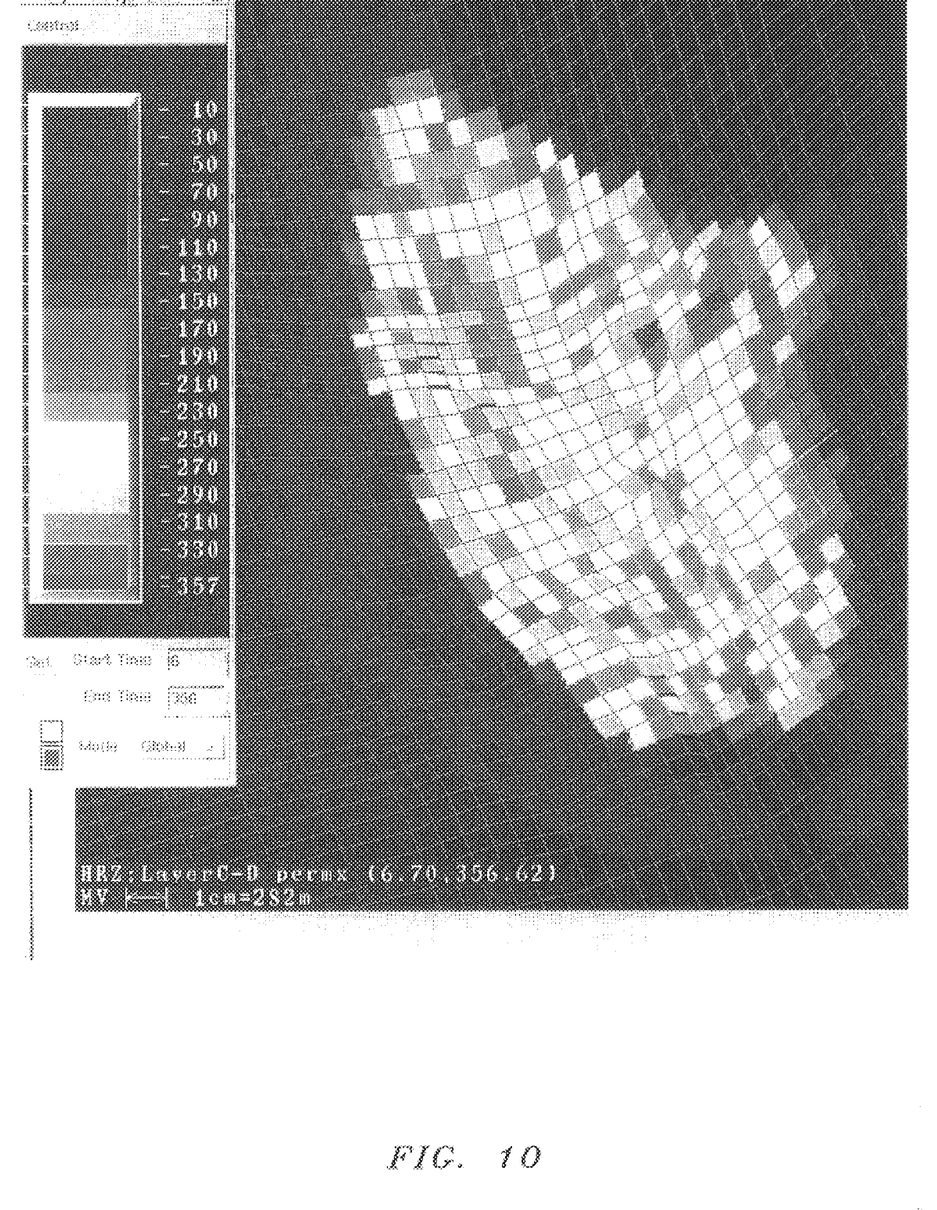
FIG. 10 is a computer generated color display predicting subterranean barriers of a reservoir based on sparse well data.
Figure 11:
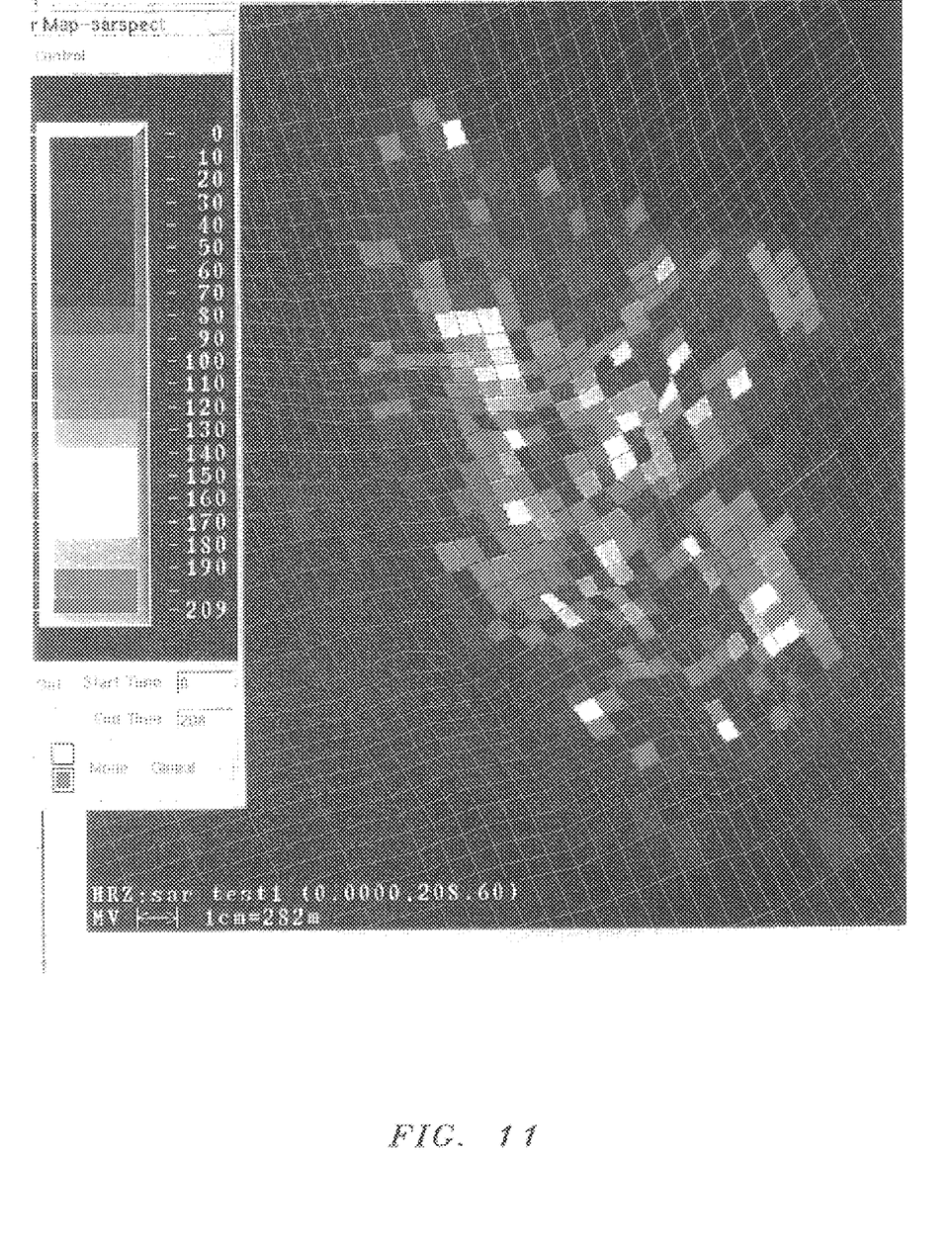
FIG. 11 is a computer generated color display predicting subterranean barriers for the reservoir of FIG. 10 according to this invention.

Referring specifically now to FIGS. 10 and 11, what is illustrated is a plan view of the surface of a subterranean layer that is parallel to a geological layer. These figures are computer generated models of the subsurface using a large number of shades and hues to show a wide range of permeability over the surface. The color coding scheme employed is an auto scaling system where the full range of color shades is scaled to represent the maximum variation in permeability values displayed in the drawing. The views include a color code in the left hand edge of the drawing which shows millidarcy values of permeability.

By way of example, FIGS. 10 and 11 represent a color display for estimates of permeability barriers in the same layer for hydrocarbon flow in the x-direction, before and after application of the present invention. In FIG. 10, the predicted barriers are based on sparse well data i.e. from tens to hundreds of wells, such that location of geological barriers to hydrocarbon flow were either extrapolated from well data, or inferred from surface seismic data. In FIG. 11, the flow numbers for the simulation cells according to this invention corresponding to the lattice overlay, were multiplied by the permeability values of the corresponding lattice overlay in FIG. 10. Accordingly, FIGS. 10 and 11 show the strong difference between a classic estimate of flow barriers, which in this instance are very smooth and uniform, versus the barriers estimated according this invention which are very irregular. Many years of production data from field operations support the more irregular flow numbers depicted in FIG. 11.

The invention as described and illustrated herein is an effective method and apparatus for determining barriers to hydrocarbon flow in a reservoir. However, those skilled in the art will recognize that many modifications and variations of the present invention are possible in light of the above teachings without departing from the invention. Such modification and variations might include using various other models for the petrophysical model required in the present invention. Accordingly it should be clearly understood that the present invention is not intended to be limited by the particular features described and illustrated in the drawings, but the concept of the present invention is to be measured by the scope of the appended claims.

That which is claimed is:

1. A computer implemented method for using both seismic and petrophysical data for determining flow characteristics within a reservoir layer, wherein a petrophysical model is derived from a basic data set including a three dimensional seismic data volume, and well log data representative of structure and texture of said reservoir layer for at least one well location within said seismic volume, said method steps comprising:
    (a) determining said petrophysical model of said reservoir layer, wherein said petrophysical model comprises a plurality of model logs of a reservoir property;
    (b) determining a flow versus nonflow state for a plurality of model data points selected as individual points on said model logs, wherein said model data points are arranged in rows and columns throughout said reservoir layer and wherein said flow state is based on comparison of the value of said model data point with predetermined cutoff or threshold values of said reservoir property for flow to take place;
    (c) dividing said reservoir layer into a plurality of adjoining subvolumes, wherein each of said adjoining subvolumes encloses one of said model data points;
    (d) analyzing a plurality of potential flow paths around and through each of said subvolumes with reference to mutually perpendicular x, y and z coordinate axes, and assigning a numerical connectivity factor (CF) to each of said subvolumes for each of said x, y and z coordinate axes;
    (e) defining a simulation cell within the three dimensional volume of said seismic survey, wherein said simulation cell includes at least four of said subvolumes;
    (f) dividing said simulation cell into a desired number of slices, wherein each slice encloses a set of said subvolumes within said simulation cell, and wherein each of said slices is normal to one of said x, y and z coordinate axes;
    (g) calculating a planar connectivity factor for a lateral direction for each one of said slices as the arithmetical average of said numerical CF factors assigned in step (d) for said lateral direction for said set of subvolumes enclosed in each of said slices;
    (h) harmonically averaging said planar connectivity factors for each slice along each of said x, y, and z axes, to define a numerical flow number for each of said x, y, and z axes for said simulation cell;
    (i) repeating step (e) through (h) to form a plurality of said simulation cells within said reservoir layer; and
    (j) using said numerical flow values for said simulation cells to demonstrate flow barriers within said reservoir layer.

2. A method in accordance with claim 1, wherein said reservoir property is selected from the group of properties consisting of:
    (i) porosity,
    (ii) permeability; and
    (iii) shaliness.

3. A method in accordance with claim 1, wherein said petrophysical model in a nonunique inversion (NUI) model.

4. A method in accordance with claim 1, wherein said seismic data volume comprises a fully migrated 3-D seismic volume, and said well log data comprises wireline well logs.

5. A method in accordance with claim 1, wherein said method step of determining said petrophysical model of said reservoir property comprises:
    (a) determining an initial petrophysical model, which is representative of measured well log data at said well location;
    (b) proposing at least two different petrophysical conditions for a plurality of forward model sites, wherein each one of said forward model sites corresponds to the lithology of a single real seismic trace of said seismic data volume, which trace is thus designated as a characteristic seismic trace for the corresponding forward model site, thereby providing a plurality of said characteristic traces corresponding to said plurality of forward model sites;
    (c) proposing at each of said forward model sites:
        (i) at least two pseudo logs for each of said proposed petrophysical conditions, wherein said pseudo logs are expressible as continuous curves of said reservoir property as a function of depth;

(ii) at least two synthetic seismic traces for each of said at least two pseudo logs, wherein each of said at least two pseudo logs is associated with said at least two synthetic seismic traces, and one of said at least two proposed petrophysical conditions, thereby providing a plurality of synthetic seismic traces and an associated plurality of pseudo logs;

(d) building a catalog comprising said plurality of synthetic seismic traces and said associated plurality of pseudo logs, and storing said catalog in said computer;

(e) selecting a first set of said synthetic seismic traces and an associated first set of pseudo logs from said catalog for association with a first characteristic trace of said plurality of characteristic traces;

(f) selecting one pseudo log from said first set of pseudo logs selected in step (e) for exclusive association with said first characteristic trace, which is thus designated as a prime pseudo log for said first characteristic trace; and (g) repeating steps (e) and (f) for each remaining one of said characteristic seismic traces, thereby providing a plurality of prime pseudo logs; and (h) wherein said plurality of prime pseudo logs selected in step (f) comprises said plurality of model log traces for determining said petrophysical model.

6. A method in accordance with claim 5, wherein said step of selecting said first set of synthetic seismic traces and an associated first set of pseudo logs comprises:

(a) comparing in said computer each synthetic seismic trace in said catalog to said first characteristic seismic trace;

(b) selecting said first set of synthetic seismic traces and associated first set of pseudo logs for association with said first characteristic seismic trace based on a numerical measure of the similarity between synthetic traces of said catalog and said first characteristic seismic traces, and wherein said numerical measure includes values for the following factors:
  (i) a cross correlation coefficient;
  (ii) a cross correlation lag;
  (iii) an absolute average difference; and
  (iv) an RB factor; and (c) repeating steps (a) and (b) for each remaining one of said characteristic traces.

7. A method in accordance with claim 5, wherein said step of selecting one pseudo log from said first set of pseudo logs comprises:

(a) comparing in said computer said first set of pseudo logs associated with said first characteristic trace with at least a second set of pseudo logs associated with a second characteristic trace, wherein said first characteristic trace and said second characteristic trace correspond to first and second forward model sites which are adjacent to one another;

(b) using the comparison made in step (a) for determining a numerical measure of the similarity between each pseudo log in said first set of pseudo logs with corresponding pseudo logs in said second set of pseudo logs;

(c) selecting said one pseudo log for describing said first forward model site as the pseudo log of said first set of pseudo logs having the highest similarity to a corresponding pseudo log of at least said second set of pseudo logs; and (d) repeating steps (a), (b) and (c) for each remaining forward model site.

8. A method in accordance with claim 1, wherein a reservoir simulation model described in part by said reservoir permeability estimate linking cell flow values which are affected by said flow numbers calculated for said reservoir model cells in step (h), and wherein said estimated linking cell flow values are based on sparse well data, the improvement comprising:

using said flow numbers calculated in step (h) as multipliers for said corresponding linking cell flow values in said reservoir simulation model.

9. A method in accordance with claim 1, additionally comprising:

using the numerical flow numbers calculated for each of said plurality of simulation cells for generating an image display of flow characteristics within said reservoir layer.

10. A method in accordance with claim 5, wherein said step of building a catalog of synthetic model traces results in a catalog containing from about 1,000 to about 200,000 synthetic seismic traces.

11. A method in accordance with claim 5, wherein said set of synthetic seismic traces selected for association with said first characteristic trace includes from about 10 synthetic traces to about 50 synthetic traces.

12. A method in accordance with claim 1 wherein said plurality of potential flow paths include five paths, and said numerical connectivity factor (CF) is calculated according to the formula:

$$CF = \frac{1}{a} + \frac{1}{b} + \frac{1}{c} + \ldots \frac{1}{n}$$

where: a, b, and c are distances between NUI data points contained in adjoining subvolumes.

13. A method in accordance with claim 12, wherein said numerical flow number for each of said x, y, and z coordinate axes for each of said simulation cells is calculated according to the formula:

$$FN = \left[ \frac{a^{-1} + b^{-1} + c^{-1} + \ldots n^{-1}}{n} \right]^{-1}$$

14. Apparatus for converting real seismic traces into a model of flow characteristics within a reservoir layer, wherein a petrophysical model derived from a basic data set including three dimensional seismic volume, and lithological well log data representative of structure and texture of said reservoir layer for at least one well location within said seismic volume, said apparatus comprising:

a computer programmed to carry out the following method steps:

(a) determining said petrophysical model of said reservoir layer, wherein said petrophysical model comprises a plurality of model logs of a reservoir property;

(b) determining a flow versus nonflow state for a plurality of model data points selected as individual points on said model logs, wherein said model data points are arranged in rows and columns throughout said reservoir layer and wherein said flow state is based on comparison of the value of said model data point with predetermined cutoff or threshold values of said reservoir property for flow to take place;

(c) dividing said reservoir layer into a plurality of adjoining subvolumes, wherein each of said adjoining subvolumes encloses one of said model data points;

(d) analyzing a plurality of potential flow paths around and through each of said subvolumes with reference to mutually perpendicular x, y and z coordinate axes, and assigning a numerical connectivity factor (CF) to each of said subvolumes for each of said x, y and z coordinate axes;

(e) defining a simulation cell within the three dimensional volume of said seismic survey, wherein said simulation cell includes at least four of said subvolumes;

(f) dividing said simulation cell into a desired number of slices, wherein each slice encloses a set of said subvolumes within said simulation cell, and wherein each of said slices is normal to one of said x, y and z coordinate axes;

(g) calculating a planar connectivity factor for a lateral direction for each one of said slices as the arithmetical average of said numerical CF factors assigned in step (d) for said lateral direction for said set of subvolumes enclosed in each of said slices;

(h) harmonically averaging said planar connectivity factors for each slice along each of said x, y, and z axes, to define a numerical flow number for each of said x, y, and z axes for said simulation cell;

(i) repeating step (e) through (h) to form a plurality of said simulation cells within said reservoir layer; and (j) using said numerical flow values for said simulation cells to demonstrate flow barriers within said reservoir layer.

15. Apparatus in accordance with claim 14, additionally comprising:

an acoustic source for injecting acoustic signals into the earth;

means for detecting acoustic reflection signals transmitted back to the surface of the earth by subterranean discontinuities; and means for recording said reflection signals.

16. A program storage device, readable by a computer, tangibly embodying a program of instructions executable by said computer for converting real seismic traces and well log data into a model of flow characteristics for a reservoir layer, said method steps comprising:

(a) determining said petrophysical model of said reservoir layer, wherein said petrophysical model comprises a plurality of model logs of a reservoir property;

(b) determining a flow versus nonflow state for a plurality of model data points selected as individual points on said model logs, wherein said model data points are arranged in rows and columns throughout said reservoir layer and wherein said flow state is based on comparison of the value of said model data point with predetermined cutoff or threshold values of said reservoir property for flow to take place;

(c) dividing said reservoir layer into a plurality of adjoining subvolumes, wherein each of said adjoining subvolumes encloses one of said model data points;

(d) analyzing a plurality of potential flow paths around and through each of said subvolumes with reference to mutually perpendicular x, y and z coordinate axes, and assigning a numerical connectivity factor (CF) to each of said subvolumes for each of said x, y and z coordinate axes;

(e) defining a simulation cell within the three dimensional volume of said seismic survey, wherein said simulation cell includes at least four of said subvolumes;

(f) dividing said simulation cell into a desired number of slices, wherein each slice encloses a set of said subvolumes within said simulation cell, and wherein each of said slices is normal to one of said x, y and z coordinate axes;

(g) calculating a planar connectivity factor for a lateral direction for each one of said slices as the arithmetical average of said numerical CF factors assigned in step (d) for said lateral direction for said set of subvolumes enclosed in each of said slices;

(h) harmonically averaging said planar connectivity factors for each slice along each of said x, y, and z axes, to define a numerical flow number for each of said x, y, and z axes for said simulation cell;

(i) repeating step (e) through (h) to form a plurality of said simulation cells within said reservoir layer; and (j) using said numerical flow values for said simulation cells to demonstrate flow barriers within said reservoir layer.

17. A program storage device in accordance with claim 16, wherein said reservoir property is selected from the group of properties consisting of:

(i) porosity (ii) permeability, and (iii) shaliness.

18. A program storage device in accordance with claim 16, wherein said petrophysical model comprises a nonunique inversion (NUI) model.

* * * * *